United States Patent
Lin et al.

(10) Patent No.: US 9,556,315 B2
(45) Date of Patent: Jan. 31, 2017

(54) DUAL CURE RESIN COMPOSITE SYSTEM AND METHOD OF MANUFACTURING THE SAME

(75) Inventors: Wendy Wen-Ling Lin, Niskayuna, NY (US); Wenliang Patrick Yang, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 189 days.

(21) Appl. No.: 12/828,316

(22) Filed: Jul. 1, 2010

(65) Prior Publication Data

US 2010/0272574 A1 Oct. 28, 2010

Related U.S. Application Data

(62) Division of application No. 11/403,674, filed on Apr. 13, 2006, now abandoned.

(51) Int. Cl.
*C08J 5/12* (2006.01)
(52) U.S. Cl.
CPC ............ *C08J 5/12* (2013.01); *Y10T 428/24058* (2015.01); *Y10T 428/249921* (2015.04); *Y10T 428/31536* (2015.04)
(58) Field of Classification Search
CPC ................ C08J 5/12; Y10T 428/24058; Y10T 428/249921; Y10T 428/31536
(Continued)

(56) References Cited

U.S. PATENT DOCUMENTS 3,574,040 A * 4/1971 Chitwood et al. ............ 156/522
4,265,723 A 5/1981 Hesse et al.
(Continued)

FOREIGN PATENT DOCUMENTS

EP 1645607 A1 4/2006
JP 57052052 A * 3/1982
(Continued)

OTHER PUBLICATIONS

Daniel L. Goodman & Giuseppe R. Palmese;"Curing and Bonding of Composites using Electron Beam Processing", Preprint of Chapter 11 in the Handbook of Polymer Blends and Composites, A. Kulshreshtha and C. Vasile, eds., Rapra Technology Ltd, publisher, Shropshire, UK. (42 Pages).

(Continued)

*Primary Examiner* — Daniel McNally
(74) *Attorney, Agent, or Firm* — Anna M. Agosti (57) ABSTRACT

A system including a dual cure composite structure is disclosed. The system also includes a first layer comprising a resin having a first and a second functional group. The system further includes a second layer comprising the resin having the first and the second functional group. The system also includes a third layer comprising the resin having the first and the second functional group. The system further includes a first covalent bond across an interface of the first and the second layer and a second covalent bond across another interface of the second and the third layer. The system further includes more than two layers comprising the resin having the first and second functional group. A method of manufacturing a system including a dual cure composite structure is also disclosed. The method includes providing a first layer comprising a resin having a first functional group and a second functional group. The method also includes applying a first curing source to partially cure the first layer. The method further includes providing a second layer comprising the resin having the first and the second functional group onto the first layer and applying a second curing source to fully cure the first layer and partially cure the second layer simultaneously.

6 Claims, 7 Drawing Sheets

(58) Field of Classification Search
USPC ...... 156/272.2, 273.3, 273.5, 275.5; 428/420
See application file for complete search history.

(56) References Cited

U.S. PATENT DOCUMENTS

| | | | |
|---|---|---|---|
| 4,642,321 A * | 2/1987 | Schoenberg | C08G 18/791 523/400 |
| 6,038,464 A * | 3/2000 | Axelgaard | A61B 5/04087 600/391 |
| 6,190,483 B1 * | 2/2001 | Yang | B29C 35/10 156/180 |
| 6,432,236 B1 * | 8/2002 | Leemon | B29C 65/081 156/308.2 |
| 7,390,559 B2 | 6/2008 | Mayo et al. | |
| 2003/0078316 A1 * | 4/2003 | Bradford et al. | 522/126 |
| 2005/0025903 A1 | 2/2005 | Fink et al. | |
| 2007/0021553 A1 * | 1/2007 | Lichte et al. | 524/591 |

FOREIGN PATENT DOCUMENTS

| | | |
|---|---|---|
| WO | 02098657 A2 | 12/2002 |
| WO | 03078477 A1 | 9/2003 |
| WO | 2004035651 A1 | 4/2004 |
| WO | WO 2004035651 A1 * | 4/2004 |

OTHER PUBLICATIONS

Dr. Joseph V. Koleske, "Dual-Cure Mechanisms"; Ch.9 in Radiation Curing of Coatings; ASTM International (ASTM stock #: MNL45); pp. 155-164.

* cited by examiner

DUAL CURE RESIN COMPOSITE SYSTEM AND METHOD OF MANUFACTURING THE SAME

This application is a divisional application of application Ser. No. 11/403,674, filed Apr. 13, 2006.

BACKGROUND

The invention relates generally to fabrication techniques and, more particularly, composite fabrication techniques and associated polymer composite-based products.

Structural composite products, such as wind turbine blades and aircraft structures, are composed of multiple layers. The conventional approach for curing these multiple layers involves curing all of the layers together at the same time in an autoclave or oven. In other words, the process involves applying the layers one over the other, and then subsequently curing all of the layers. The adhesion between layers is generally good but other disadvantages sometimes make this approach not practical. For instance, in manufacturing the root section of a wind turbine blades, sagging and dimensional distortion and fiber wrinkling during compaction may occur during curing cycle. Also, excessive reaction exotherm from thick parts may cause problems. Another approach for curing these multiple layers involves sequentially applying and completely curing layers one after another using a single curing mechanism. In other words, a first composite layer is cured completely before laying down a second composite layer. The second composite layer is then cured completely before laying down a third composite layer. The process adds additional composite layers in the same sequential manner using the single curing mechanism. Unfortunately, this fabrication technique creates relatively weak secondary adhesive bonds between the composite layers. These secondary adhesive bonds result in undesirably low interlaminar strength.

Hence, an improved technique needs to be developed to address the aforementioned issues.

BRIEF DESCRIPTION

In accordance with one aspect of the invention, a method includes activating a first functional group of a resin in a first layer in response to a first curing source. The method further includes sequentially activating a second functional group of the resin in the first layer and the second functional group of the resin in a second layer disposed on the first layer in response to a second curing source. The method further includes creating a first covalent bond across an interface of the first layer and the second layer.

In accordance with another aspect of the invention, a method includes providing a first layer comprising a resin having a first functional group and a second functional group. The method also includes applying a first curing source to activate the first functional group and partially cure the first layer. The method further includes applying a second layer comprising the resin having the first and the second functional group onto the first layer. A second curing source is then applied to fully cure the first layer and partially cure the second layer simultaneously by activating the second functional group in the first and second layer.

In accordance with another aspect of the invention, a system includes a dual cure composite structure having a first layer with a material having a first and a second functional group. The system also includes a second layer with the material having the first and the second functional group. The system further includes a third layer with the material having the first and the second functional group. The system also includes a first covalent bond across an interface of the first and the second layer. A second covalent bond across another interface of the second and the third layer is also included in the system. Further, the method can be extended beyond the three layer system described here by alternatively activating the first and second functional groups sequentially of the subsequently disposing layers and creating alternating covalent bonds on alternating interfaces.

In accordance with another aspect of the invention, a method including partially curing a first composite layer with a first curing feature is included. The method also includes disposing a second composite layer along the first composite layer. The method further includes simultaneously curing the first and second composite layers with a second curing feature to further cure the first composite layer and to partially cure the second composite layer, wherein the first and second curing features are different from one another.

In accordance with another aspect of the invention, a manufacturing system having one or more curing sources configured to fully or partially cure a layer of a composite structure is included. The system also includes a machine configured to dispose a layer of a dual cure composite structure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention provide a composite structure with a dual cure mechanism and a method of manufacturing the same. A dual cure composite structure used herein is defined as a composite structure having multiple layers, wherein the composite structure is manufactured using a "dual cure" mechanism to bond the multiple layers. "Dual cure" mechanism is a mechanism in which initially, a first layer is partially cured by a first curing feature followed by a second layer being disposed on top of the first layer. In a next step, the second layer is partially cured and the first layer is at least further or fully cured simultaneously by a second curing feature. In certain embodiments, the "dual cure" mechanism may be supplemented with one or more additional curing features, making the mechanism a generally "multi cure" mechanism. For example, the foregoing dual cure scenario may be supplemented by further applying a third layer on top of the second layer, and then partially curing the third layer and further or entirely curing the second layer simultaneously by a third curing feature. In this example, the first layer also may be further or entirely cured by the third curing feature simultaneous with the curing of the second and third layers. Similarly, a fourth, fifth, sixth, or additional layers may be successively applied over the composite structure, and successively cured in stages of partial, and eventually complete curing via two or more curing features (e.g., the first, second, or more curing features). Again, the curing features generally alternate (e.g., feature 1, 2, 1, 2, etc.) as each successive layer is applied and simultaneously partially cured along with a previous layer. In this manner, the disclosed "dual cure" or "multi cure" mechanism may be described as "overlapping stages of curing" or "staged curing" or "step curing" of adjacent layers to create covalent bonds across interface of the layers and hence improve the interlayer adhesion.

Rapid curing systems are desirable for large composite structures to obtain the desired manufacturing cycle time, reduce significant plant and equipment investment, and further decrease base cost of a part. This requires integration of appropriate resin chemistry with a corresponding curing source. In a system disclosed herein, for large composite structures, more than one independent curing source is introduced to activate a dual cure mechanism that will control a curing state and bonding between layers of the composite structure to achieve desirable mechanical properties. Curing source is a source used in curing layers of a composite structure. Non-limiting examples of a curing source are ultraviolet frequency radiation, or microwave frequency radiation, or radio frequency, or visible frequency radiation, or ultrasonic, or laser, or electron beam or a combination thereof.

Figure 1:
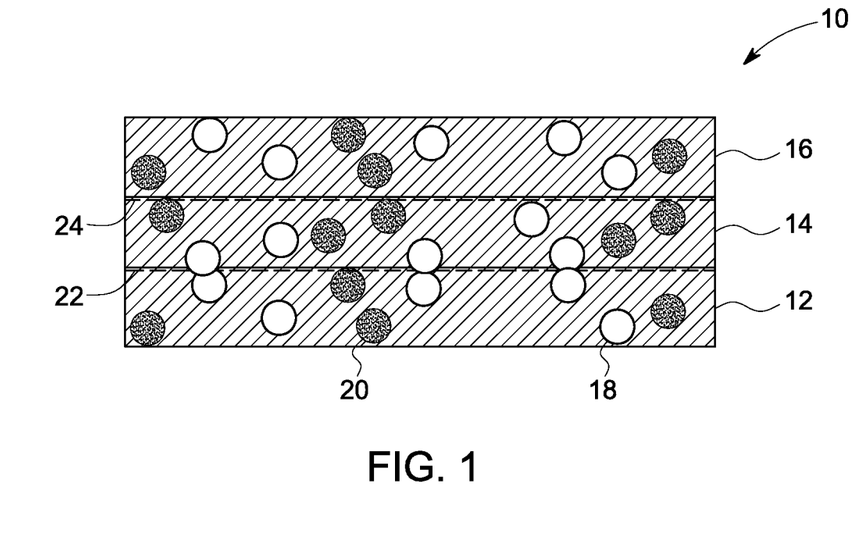
FIG. 1 is a cross-sectional view of a dual cure composite structure comprising a resin and illustrating cured layers of a resin with dual functional groups in accordance with embodiments of the present invention.

Turning now to the drawings, FIG. 1 is a cross-sectional view of a dual cure composite structure 10 including a first layer 12, a second layer 14 and a third layer 16 of a resin or another material in accordance with embodiments of the present invention. As used herein, "resin" includes a resin or a resin blend. The composite structure 10 may include two or more layers of a resin. In alternative embodiments, the composite structure 10 may include two or more layers of another type of material. The first layer 12 includes a first functional group 18 and a second functional group 20. As used herein, the "functional group" is defined as an atom or a group of atoms in an organic compound that provides the compound with some of its characteristics which make it respond to a specific curing mechanism. Some non-limiting examples of functional groups include aldehydes, amines, hydroxyl, acrylate, methacrylate, vinyl, cyclo-epoxide, glycidyl etherepoxide with amine curatives, urethane, thiol-ene reactive group or a combination thereof. Some non-limiting examples of resins comprising these functional groups are unsaturated polyesters, vinyl esters, melamines, urea-formaldehydes, phenolics, methacrylates, acrylates, epoxies, urethanes, etc. A second layer 14 of the resin including the first functional group 18 and the second functional group 20 is disposed on the first layer 12. Similarly, a third layer 16 of the resin including the first 18 and the second 20 functional groups is disposed on the second layer 14 of the resin. The first 12 and the second 14 layers are bonded by a covalent bond formed at an interface 22 of the two layers. Similarly, the second 14 and the third 16 layers are bonded by a covalent bond at an interface 24 of the two layers. Further, in a non-limiting example, the composite structure 10 includes carbon, fiberglass, basalt fiber, and polymer fiber (such as polyethylene and polyimide) composites. Some non-limiting examples of the dual cure chemistry and curing sources are listed below:

TABLE 1

| | Mechanism | Functional Group/Curing Source | Chemistry |
|---|---|---|---|
| Ex. 1 | UV | First Functional Group Curing Source 1 | Acrylate + photoinitiator UV light |
| | thermal | Second Functional Group Curing Source 2 | Amine + epoxy Microwave or Infrared |
| Ex. 2 | UV | First Functional Group Curing Source 1 | Acrylate + photoinitiator UV light |
| | thermal | Second Functional Group Curing Source 2 | isocyanate + alcohol Microwave or Infrared |
| Ex. 3 | EB | First Functional Group Curing Source 1 | Epoxy + cationic catalyst EB |
| | thermal | Second Functional Group Curing Source 2 | isocyanate + alcohol Microwave or Infrared |
| Ex. 4 | EB | First Functional Group Curing Source 1 | Acrylate EB |
| | thermal | Second Functional Group Curing Source 2 | Amine + epoxy Microwave or Infrared |
| Ex. 5 | UV | First Functional Group Curing Source 1 | Acrylate + photoinitiator UV |
| | thermal | Second Functional Group Curing Source 2 | Amine + epoxy Microwave or Infrared |
| Ex. 6 | UV | First Functional Group Curing Source 1 | Epoxy + cationic photoinitiator UV |
| | thermal | Second Functional Group Curing Source 2 | Vinyl ester + peroxide Microwave or Infrared |
| Ex. 7 | UV | First Functional Group Curing Source 1 | Acrylate + photoinitiator 1 UV - Frequency 1 |
| | UV | Second Functional Group Curing Source 2 | Epoxy + cationic photoinitiator UV - Frequency 2 |

Ex. 1 in Table 1 illustrates applying a curing source 1 (UV) source to initiate photo curing of the first functional group (acrylate) and applying curing source 2 (infrared) to thermally cure the second functional groups (epoxy with amine) according to the embodiment described in FIG. 1. Ex. 2-Ex. 7 follow similar lines.

Figure 2:
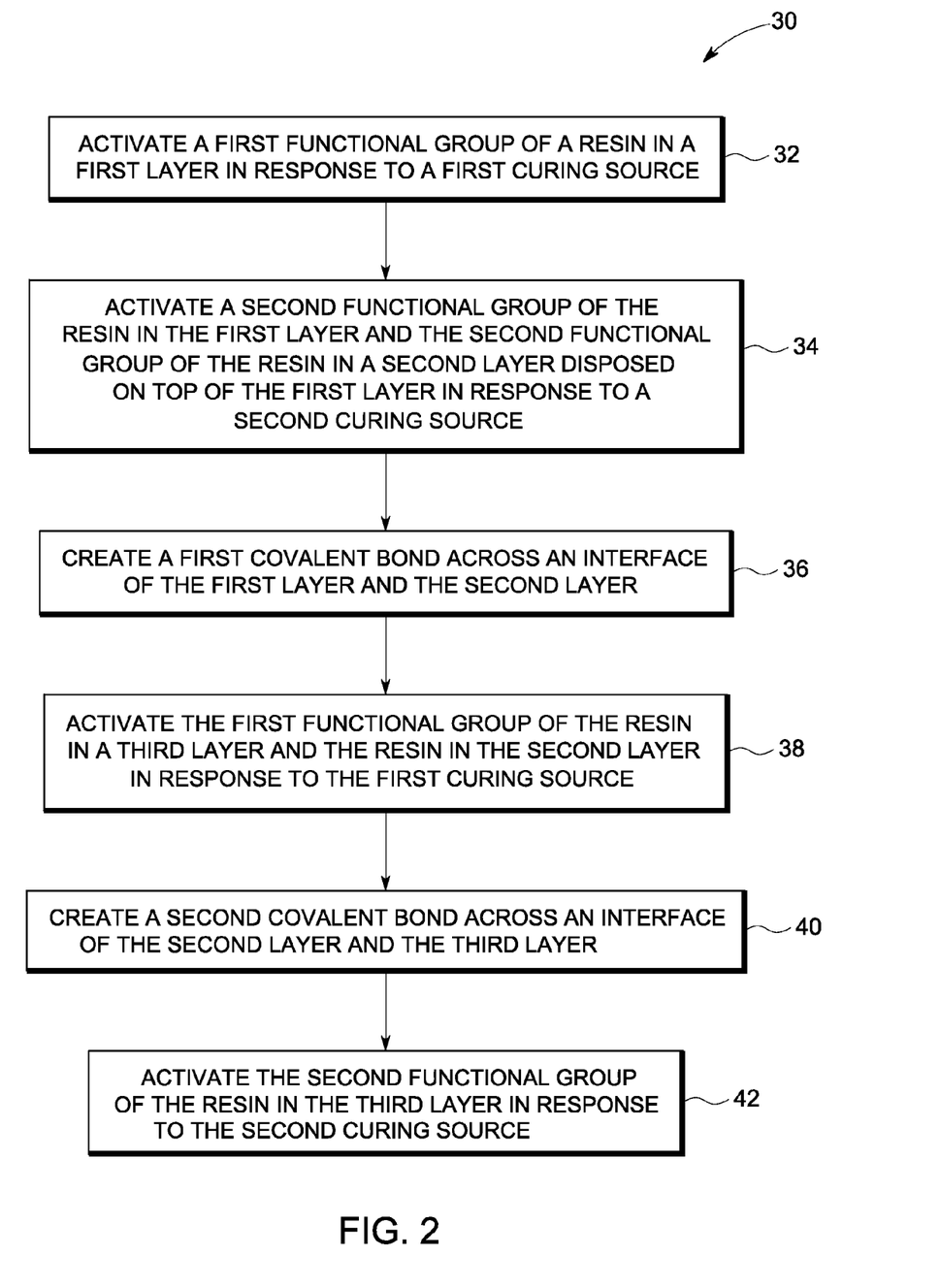
FIG. 2 is a flow chart illustrating exemplary steps for a method of curing a dual cure composite structure illustrating a dual cure mechanism in accordance with certain embodiments of the present invention.

FIG. 2 illustrates a method 30 of curing a dual composite structure 10 in accordance with certain embodiments of the present invention. The method 30 includes activating a first functional group of a resin in a first layer in response to a first curing source at step 32. The method 30 further includes activating a second functional group of the first layer and the second functional group of a second layer disposed on top of the first layer in response to a second curing source at step 34. Following activation of the first functional group 18 (as referenced to in FIG. 1) and the second functional group 20 (as referenced to in FIG. 1) of the first layer 12 (as referenced to in FIG. 1), the first layer may be fully cured. In certain embodiments, as noted above, the layers may include additional functional groups, such that the full curing of the layers may occur over three or more stages of curing with three or more curing sources. However, the illustrated embodiment includes two curing sources, such that each successive layer is generally completely cured in two stages.

Referring back to FIG. 2, activation of the second functional group 20 of the second layer 14 (as referenced to in FIG. 1) results in partial curing of the second layer 14. These lead to creating a first covalent bond across an interface of the first layer and the second layer at step 36. The method 30 further includes activating a first functional group of a third layer and the first functional group of the second layer in response to the first curing source at step 38. This leads to a partially cured third layer 16 (as referenced to in FIG. 1) and a fully cured second layer 14. These result in creating a second covalent bond across an interface of the second layer and the third layer at step 40. The method 30 further includes activating the second functional group of the third layer in response to the second curing source at step 42. This leads to a fully cured third layer 16. Simultaneous curing of two layers results in a stronger adhesive bonding than that formed via a single curing mechanism. This results in stronger interlaminar shear strengths and eliminates interlaminar property degradation.

Figure 3:
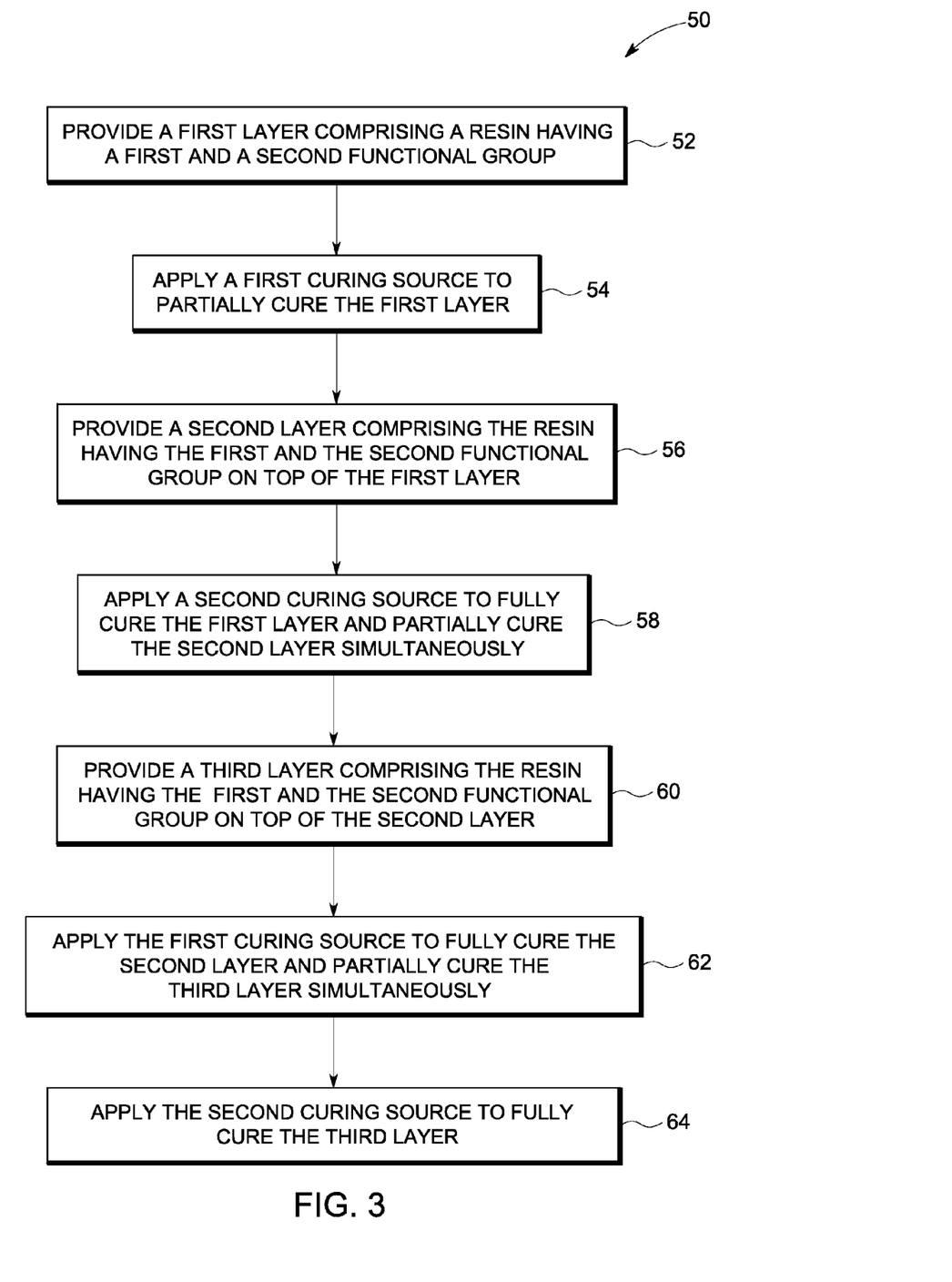
FIG. 3 is a flow chart illustrating exemplary steps for a method of manufacturing a dual cure composite structure comprising layers of resin with dual functional groups in accordance with certain embodiments of the present invention.

FIG. 3 illustrates an exemplary method 50 of manufacturing a dual cure composite structure 10 as referenced to in FIG. 1 comprising a first 12, a second 14 and a third 16 layer of resin in accordance with certain embodiments of the present invention. The first 12, the second 14 and the third 16 layers further include a first 18 and a second 20 functional group as referenced in FIG. 1. The method 50 includes providing a first layer comprising a resin having a first functional group and a second functional group as step 52. The method 50 further includes applying a first curing source to partially cure the first layer at step 54. The term 'partial curing' refers to curing less than about 100% of a layer of a composite structure. In certain embodiments, partial curing may be about 10, 20, 30, 40, 50, 60, 70, 80, or 90 percent, or some percentage between these values. In an exemplary embodiment, the partial curing may be between about 30-70 percent, or between 40-60 percent, or about 50 percent. However, the degree of partial curing may vary depending on the particular materials, curing source, layer thickness, and so forth.

Following partial curing of the first layer, the method 50 includes providing a second layer comprising the resin having the first and the second functional group onto the first layer as step 56. Following addition of the second layer, the method 50 includes applying a second curing source to fully cure the first layer and partially cure the second layer simultaneously as step 58. The third layer 16 may further be introduced by providing a third layer comprising the resin having the first and the second functional group onto the second layer as step 60. Simultaneous curing of the second 14 and the third 16 layers occur by applying the first curing source to fully cure the second layer and partially cure the third layer simultaneously as step 62. Full curing of the third layer 16 occurs by applying the second curing source to fully cure the third layer as step 64.

Figure 4:
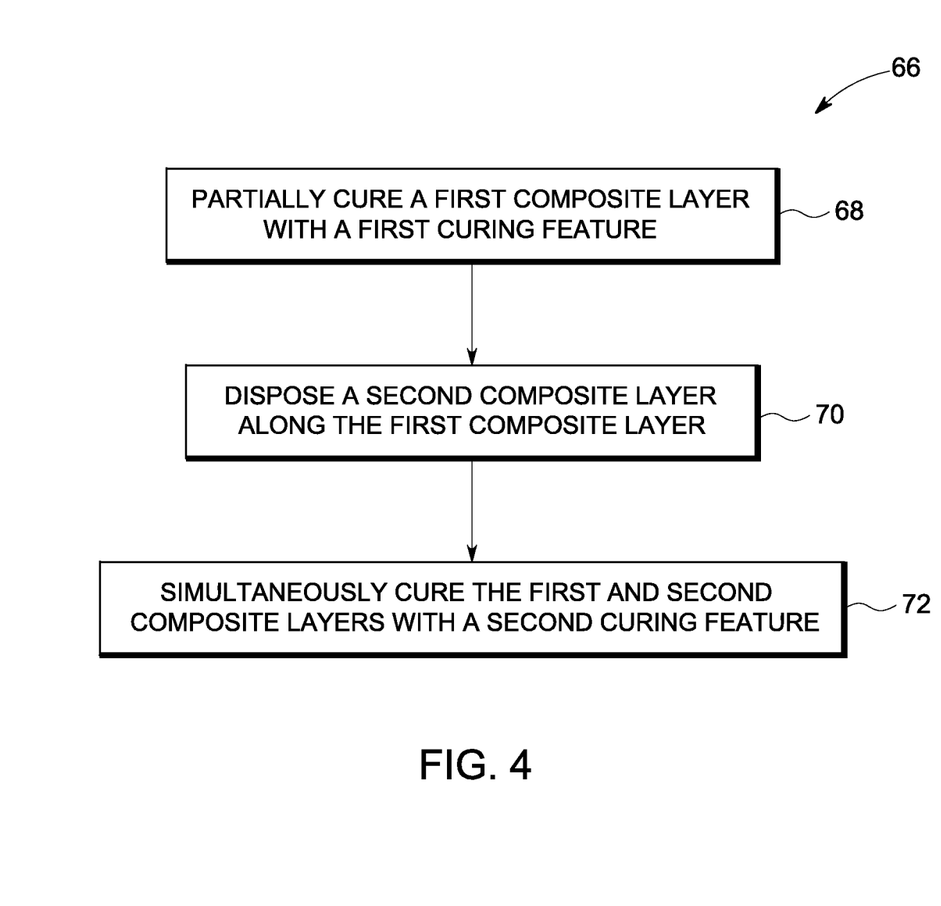
FIG. 4 is a flow chart illustrating exemplary steps for a method of manufacturing a composite structure with a dual cure mechanism in accordance with certain embodiments of the present invention.

FIG. 4 illustrates a method 66 of manufacturing and curing a dual cure composite structure 10 as referenced to in FIG. 1 including a first 12 and a second 14 layer in accordance with certain embodiments of the present invention. The method 66 includes partially curing a first composite layer with a first curing feature as step 68. Following the partial curing, a second composite layer 14 is introduced by disposing a second composite layer along the first composite layer as step 70. The method 66 further includes simultaneously curing the first and second composite layers with a second curing feature to further cure the first composite layer and to partially cure the second composite layer, wherein the first and second curing features are different from one another as step 72. The first and second curing features include different curing mechanisms, or the same curing mechanism having different output characteristics, or a combination of both. For example, several curing mechanisms and characteristics are described in further detail below.

Figure 5:
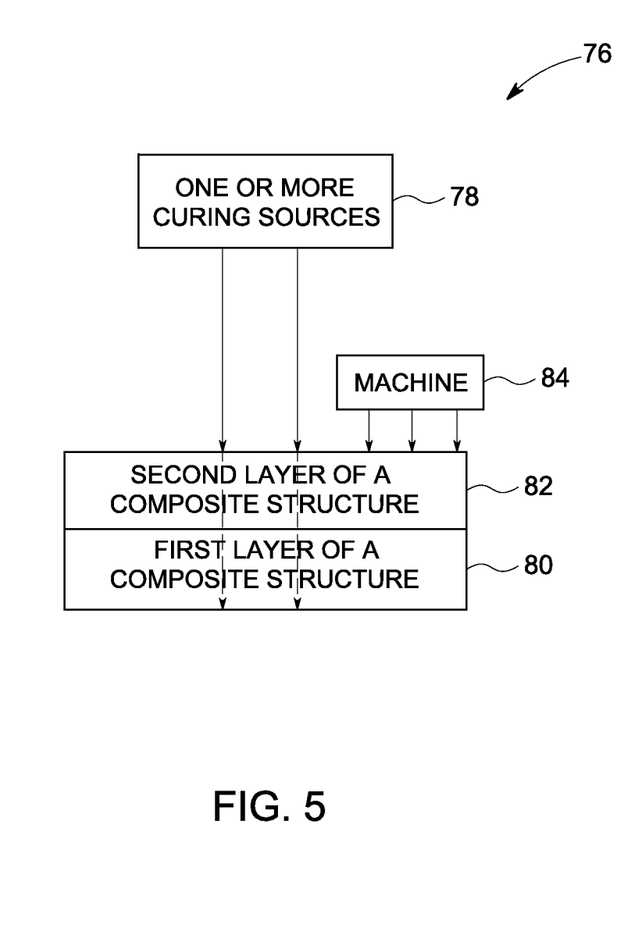
FIG. 5 is a block diagram of a manufacturing system used in a dual curing mechanism in a composite structure in accordance with certain embodiments of the present invention.

FIG. 5 is an illustrated embodiment of a manufacturing system 76 used in a dual curing process of a dual cure composite structure 10 as referenced in FIG. 1. The manufacturing system 76 comprises one or more curing sources 78 configured to simultaneously cure a first layer 80 and a second layer 82 of the dual cure composite structure 10. The manufacturing system 76 further includes a machine 84 configured to dispose the second layer 82 on top of the first layer 80. The machine 84 includes a machine that can be operated manually, or an automated machine, or a combination thereof. In certain embodiments, the machine 84 may include a flat press, a roll press, hydraulics, springs, pneumatics, gear mechanisms, or other compressive mechanisms to force the layers toward one another. A non-limiting example of an automated machine includes an automated fiber and tape placement head and compaction roller. The one or more curing sources 78 include an ultraviolet frequency radiation source, or a microwave frequency radiation source, or a radio frequency radiation source, or a visible frequency radiation source, or an ultrasonic radiation source, or an infrared, or a laser, or an electron beam or a combination thereof. The one or more curing source 78 may include different curing types or different characteristics of the same curing type. In a non-limiting example, the one or more curing sources may include a single or two curing sources of the same type but emitting radiation (e.g., ultraviolet radiation) at different wavelengths, or frequencies. In another non-limiting example, the one or more curing sources may include two different types such as one curing source with ultra-violet radiation and a different curing source with microwave radiation, or one curing source with electron beam and one curing source with infrared radiation, or one curing source with microwave and one curing source with electron beam, or one curing source with UV-A and one curing source with UV-B, or once curing source with one microwave frequency C and one curing source with another microwave frequency.

Joining and assembling of piece-parts and subcomponents into monolithic structures is particularly advantageous and useful for modular design. Although both mechanical and adhesively bonded joints may be used, adhesive bonds generally provide for lower weight designs and a desirable strength. The disclosed dual curing mechanism provides a desirable strength and potential for adhesive bonds in composite structures comprising resins as described in previous paragraphs. Composite structures including resins may be used as materials in mechanical components for desirable adhesive bonding during joining and assembling of mechanical components.

Figure 6:
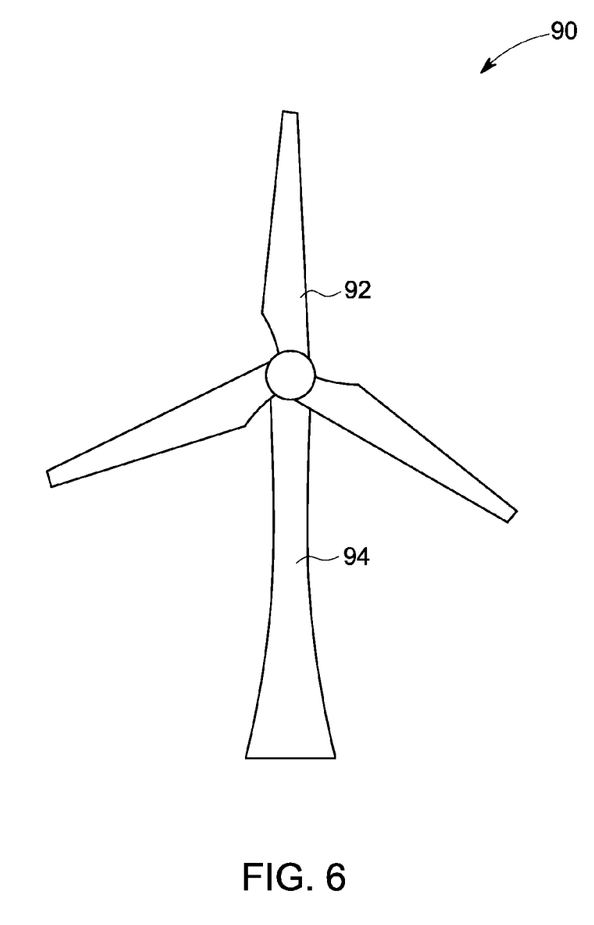
FIG. 6 is a diagrammatical illustration of an exemplary embodiment of the dual cure composite structure used in a wind turbine system comprising blades in accordance with embodiments of the present invention.

FIG. 6 is a diagrammatical illustration of an exemplary embodiment of a dual composite structure 10 as referenced to in FIG. 1, illustrating a wind turbine system 90 in accordance with embodiments of the present invention. Some of the characteristics that make composites, such as carbon and fiberglass composites, suitable for wind turbine blades are desirable mechanical properties, tailorability of material properties, and versatility of fabrication methods. In addition, the carbon and fiberglass composites provide desirable toughness and shorter process cycle time than that known in existing manufacturing processes. The wind turbine system 90 includes a plurality of blades 92 (e.g., three blades). The blades 92 enable the system 90 to capture energy from the wind. Specifically, the wind forces the blades 92 to rotate about an axis, thereby driving an electrical generator disposed within the system 90. Long blades are desirable since it provides a big lever to capture desirable amounts of energy. In a non-limiting example, the blades 92 of the wind turbine system 90 have a typical length of about 70 meters to maximize capture of energy and reduce cost of energy. Components of the blade 92 may comprise the dual cure composite structure 10 as discussed below. The blades 92 are coupled to a tower 94. The height of the tower, which determines height of the wind turbine system 90, plays a significant part in design of the wind turbine system 90. Due to change in velocity of wind with altitude, also known as wind shear, an optimum height is desirable for optimum performance of the wind turbine system 90. Generally, height of the tower 94 is about two to three times length of the blades 92 for an optimal performance.

Figure 7:
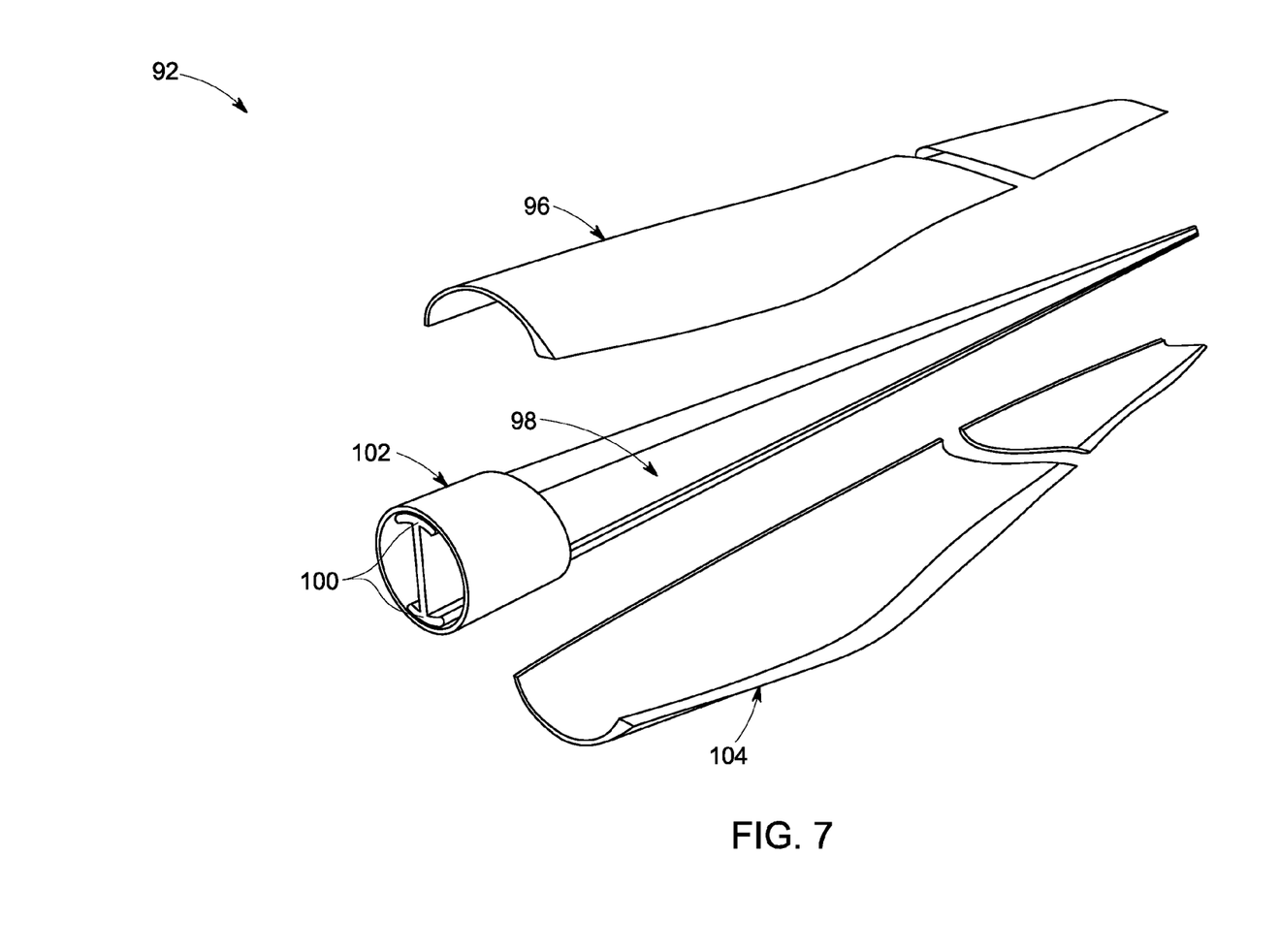
FIG. 7 is a diagrammatical illustration of the blades in the wind turbine system, such as illustrated in FIG. 6, in accordance with certain embodiments of the present invention.

FIG. 7 illustrates a modular design of a blade 92 as referenced in FIG. 6 of a wind turbine system 90 in accordance with certain embodiments of the present invention. The illustrated blade 92 includes a top skin 96 and a shear web 98 disposed between a pair of spar caps 100 that are coupled to a barrel 102. The shear web 98 provides desirable strength to the blade 92 and also provides desirable support to the pair of spar caps 100. The blade 92 further includes a bottom skin 104 disposed below the shear web 98. The pair of spar caps 100 is made of a dual cure composite 10, such as a carbon and a fiberglass composite. Since the blade 92 is a significant component of the wind turbine blade system 90 as referenced to in FIG. 6, using a dual cure composite structure 10 as referenced to in FIG. 1 and described in the aforementioned embodiments, provides desirable mechanical strength to the turbine blade system 90. Further, the top skin 96 and the bottom skin 104 may comprise the dual cure composite structure 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of manufacture of a resin composite comprising:
   Step 1: providing a first layer comprising a resin having a first functional group and a second functional group; wherein Step 1 is followed by
   Step 2: applying a first curing source to the first layer to partially cure the first layer; wherein Step 2 is followed by
   Step 3: providing a second layer comprising the resin having the first and the second functional group onto the partially cured first layer; wherein Step 3 is followed by
   Step 4: applying a second curing source to the second layer to simultaneously fully cure the first layer and partially cure the second layer,
   wherein all of the curing sources applied to the layers are Group 2 curing sources, wherein Group 2 is any of a microwave frequency radiation source, an infrared source, or a combination thereof, and
   wherein all curing sources applied to the first layer and the second layer are all from Group 2 curing sources and
   wherein the first curing source and the second curing source each are microwave frequency radiation source, an infrared source, or a combination thereof.

2. The method of claim 1 further comprising:
   applying a third layer comprising the resin having the first and the second functional groups onto the partially cured second layer;
   applying the first curing source to the third layer to simultaneously fully cure the second layer and partially cure the third layer; and applying the second curing source to fully cure the third layer.

3. The method of claim 1 further comprising providing more than two layers comprising the resin having the first and the second functional groups.

4. The method of claim 1 wherein applying the first curing source to partially cure the first layer comprises curing less than 100% of the first layer.

5. The method of claim 1 wherein applying the second curing source to simultaneously fully cure the first layer and partially cure the second layer comprises curing less than 100% of the second layer.

6. The method of claim 1 wherein providing the first layer and the second layer comprises using an automated fiber tape placement machine.

* * * * *